United States Patent
Anderson et al.

(10) Patent No.: US 12,409,821 B2
(45) Date of Patent: Sep. 9, 2025

(54) ZERO TURNING RADIUS MOWER PARK BRAKE SYSTEM

(71) Applicant: DEERE & COMPANY, Moline, IL (US)

(72) Inventors: Maxwell G. Anderson, Hartford, WI (US); Sijith P M, Badakara (IN); Sean V. Link, Madison, WI (US); Sam E. Kuehn, West Bend, WI (US); William J. Pickart, Juneau, WI (US); Meghan M. Krause, Menomonee Falls, WI (US)

(73) Assignee: DEERE & COMPANY, Moline, IL (US)

( * ) Notice: Subject to any disclaimer, the term of this patent is extended or adjusted under 35 U.S.C. 154(b) by 429 days.

(21) Appl. No.: 18/058,335

(22) Filed: Nov. 23, 2022

(65) Prior Publication Data

US 2024/0166183 A1    May 23, 2024

(51) Int. Cl.
| | | |
|---|---|---|
| *A01D 69/10* | (2006.01) | |
| *B60T 11/04* | (2006.01) | |
| *F16D 65/28* | (2006.01) | |
| *B62D 1/12* | (2006.01) | |
| *F16D 121/14* | (2012.01) | |

(52) U.S. Cl.
CPC ............ *B60T 11/046* (2013.01); *F16D 65/28* (2013.01); *B62D 1/12* (2013.01); *F16D 2121/14* (2013.01)

(58) Field of Classification Search
CPC .... B60T 11/046; F16D 65/28; F16D 2121/14; B62D 1/12
USPC ....... 56/11.3–11.9; 188/2 D, 170; 192/224.1, 192/224.2
See application file for complete search history.

(56) References Cited

U.S. PATENT DOCUMENTS

| | | |
|---|---|---|
| 6,434,917 B1 | 8/2002 | Bartel |
| 6,729,115 B2 | 5/2004 | Bartel |
| 6,739,116 B2 | 5/2004 | Stover et al. |
| 7,677,371 B2 | 3/2010 | Dong et al. |
| 7,686,108 B2 | 3/2010 | Piontek |
| 8,240,420 B1 | 8/2012 | Bartel et al. |
| 8,573,368 B2 | 11/2013 | Stover et al. |
| 9,313,953 B2* | 4/2016 | Borshov ................. B60T 11/21 |
| 9,510,503 B2 | 12/2016 | Elhardt et al. |
| 9,668,405 B2 | 6/2017 | Albinger et al. |
| 10,045,485 B2 | 8/2018 | Burns et al. |
| 10,570,869 B2 | 2/2020 | Dwyer |

(Continued)

FOREIGN PATENT DOCUMENTS

CN    106114477 A    11/2016

OTHER PUBLICATIONS

Great Britain Combined Search and Examination Report issued in application No. GB2315330.7 dated Apr. 5, 2024, 07 pages.

*Primary Examiner* — Christopher P Schwartz

(57) ABSTRACT

A zero turning radius mower park brake system includes a pair of steering levers attached to steering arm brackets that are pivotable forward and reverse on a first axis for rotating a pair of traction drive wheels in forward or reverse, and pivotable outwardly on a second axis while in a neutral position. A wire cable connects each steering arm bracket to a park brake. The wire cable retracts sufficiently to actuate the park brake when the steering arm bracket is pivoted outwardly on the second axis, but does not actuate the park brake when the steering arm bracket it pivoted forward or reverse. At least one spring provides a force urging the park brake into engagement when the steering arm pawls to park brake engaged position.

11 Claims, 5 Drawing Sheets

(56) References Cited

U.S. PATENT DOCUMENTS

| | | |
|---|---|---|
| 10,681,867 B2 * | 6/2020 | Dunbar .................. A01D 34/66 |
| 10,986,782 B2 | 4/2021 | Fisher et al. |
| 11,215,218 B2 | 1/2022 | Wagner |
| 11,589,513 B2 | 2/2023 | Reese |
| 2012/0241263 A1 | 9/2012 | Stover et al. |
| 2014/0262630 A1 | 9/2014 | Borshov et al. |
| 2019/0274251 A1 | 9/2019 | Dunbar et al. |
| 2020/0000039 A1 | 1/2020 | Reese |
| 2020/0269917 A1 | 8/2020 | Welz et al. |
| 2021/0289700 A1 | 9/2021 | Decker et al. |
| 2023/0032914 A1 | 2/2023 | Asano et al. |
| 2023/0122499 A1 | 4/2023 | Holeton et al. |

\* cited by examiner

ZERO TURNING RADIUS MOWER PARK BRAKE SYSTEM

FIELD OF THE INVENTION

This invention relates to grass mowing machines, and specifically to zero turning radius ("ZTR") mowers having independently powered left and right drive wheels controlled by a pair of steering arms.

BACKGROUND OF THE INVENTION

Grass mowing machines known as zero turning radius ("ZTR") mowers have at least one independently powered drive wheel on each side of a frame. One drive wheel may be operated in a forward direction while the other drive wheel may be stopped or operated in reverse. Many ZTR mowers have a twin stick control system. A pair of steering arms or control levers may be provided side-by-side, with each steering arm controlling one of the drive wheels. When both steering arms or control levers are advanced together forwardly out of their neutral position, both drive wheels rotate forwardly to cause the mower to move forward. A ZTR mower may be steered by advancing one steering arm or control lever more than the other.

Typically, each steering arm or control lever on a ZTR mower may be linked to a pump arm of one of two separate hydraulic pumps, or of a dual hydraulic pump; i.e., a separate pump for each wheel. The steering arm or control lever may be used to move a pump swash plate through a direct linkage, or provide drive signals to an electric motor.

The steering arms or control levers on a ZTR mower may be mounted on the vehicle frame so that each has a first or forward/reverse pivot axis allowing the steering arm or control lever in the operating position to pivot forwardly in an arc to turn the wheel in forward, or pivot rearwardly to turn the wheel in reverse. Additionally, when a steering arm or control lever is in neutral, between forward and reverse, the operator may pivot it outwardly on a second pivot axis. The ZTR mower may stay in neutral when the steering arms or control levers are pivoted outward.

Some ZTR mowers have mechanisms to engage park brakes when the steering arms or control levers are pivoted outward. For example, U.S. Pat. Nos. 6,434,917 and 6,729,115 for Mower with Combined Steering and Brake Levers relates to linkages connected between each steering lever and brake mechanism, which engages or releases a park brake when the steering lever is moved laterally outward from then neutral position. U.S. Pat. No. 6,739,116 for Powered Actuator System for Mower Parking Brake System relates to an electrically powered actuator system that includes a solenoid that may be de-energized or energized to engage or disengage the parking brake. U.S. Pat. No. 7,677,371 for Mower With Automatic Parking Brake relates to a hydraulic parking brake actuator that senses the position of the steering lever and controls a valve for high pressure fluid to flow to the actuator to disengage the parking brake. U.S. Pat. No. 7,686,108 for Electrically Released parking Brake for Zero Turn Radius Mower relates to switches that allow air cylinders to exhaust pressurized air so that tension springs may actuate the brakes. U.S. Pat. No. 8,240,420 for Steering Mechanism relates to a sensor for activating parking brakes for sensing the lever assembly when it is in the outboard position. U.S. Pat. No. 8,573,368 for Motor Driven Parking Brake Actuator System for Mower relates to an electric motor that drives a gear reduction assembly rotating an output shaft linked to the parking brakes. U.S. Pat. No. 9,313,953 for Parking Brake System for a Lap Bar Controlled Zero Turn Radius Mower relates to an actuation assembly with a rotatable push arm connected to the lower end of each lap bar, and is spaced apart from a rotatable pedal arm in a disengaged position, and in contact in an engaged position.

A low cost zero turning radius mower park brake system is needed that may be engaged and disengaged with the steering levers,

SUMMARY OF THE INVENTION

A zero turning radius mower park brake system includes a steering arm bracket connected by a wire cable to a park brake actuator. The steering arm bracket is pivotable on a first axis between a forward position and a reverse position, and on a second axis between an inward position and an outward position. The steering arm bracket retracts the wire cable sufficiently to cause the park brake actuator to actuate a park brake when the steering arm bracket pivots to the outward position, but does not actuate the park brake when the steering arm bracket pivots to the forward position or the reverse position.

DESCRIPTION OF THE PREFERRED EMBODIMENT

Figure 1:
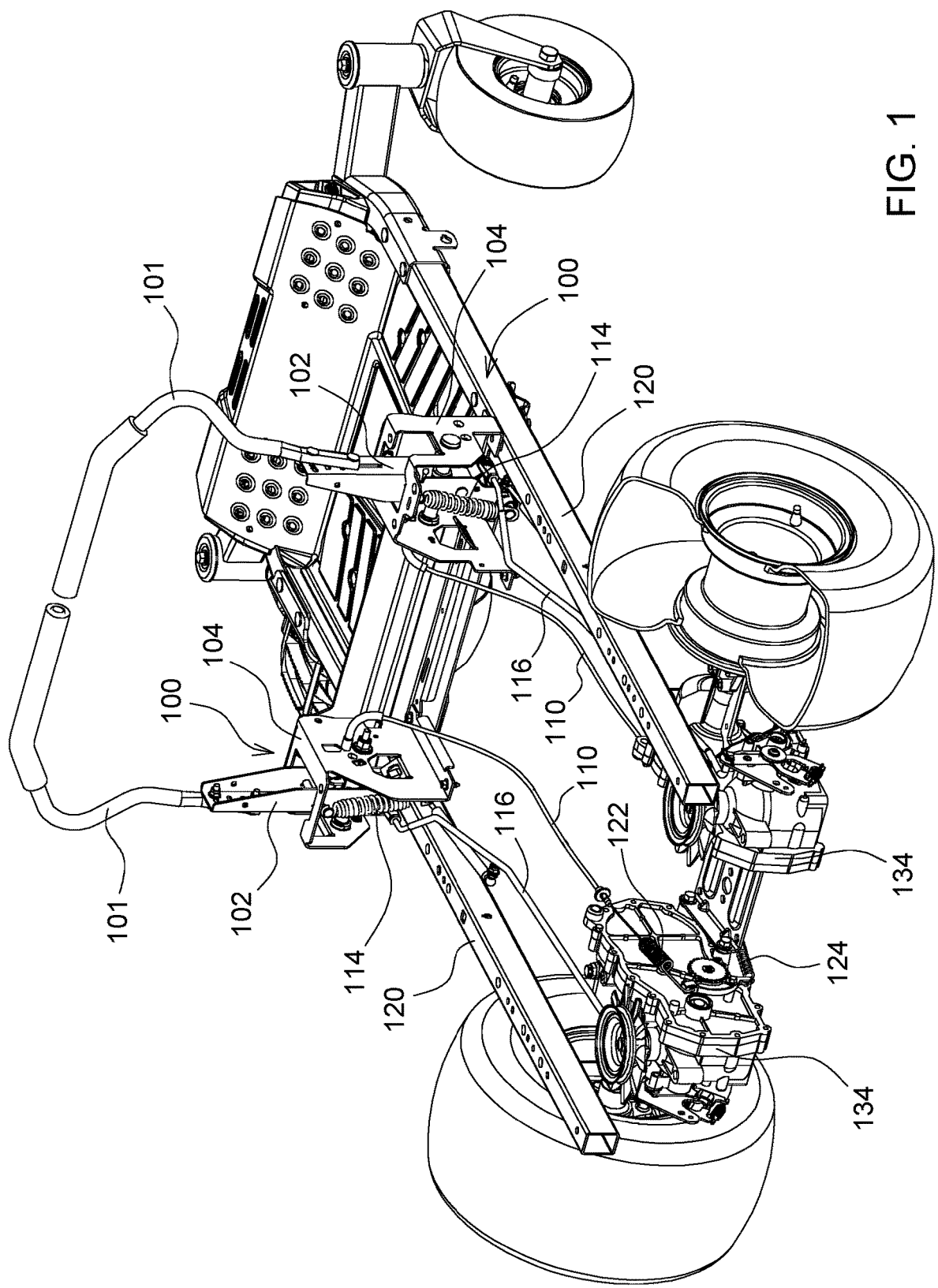
FIG. 1 is a perspective view of a ZTR mower with a zero turning radius mower park brake system according to a first embodiment of the invention.
Figure 2:
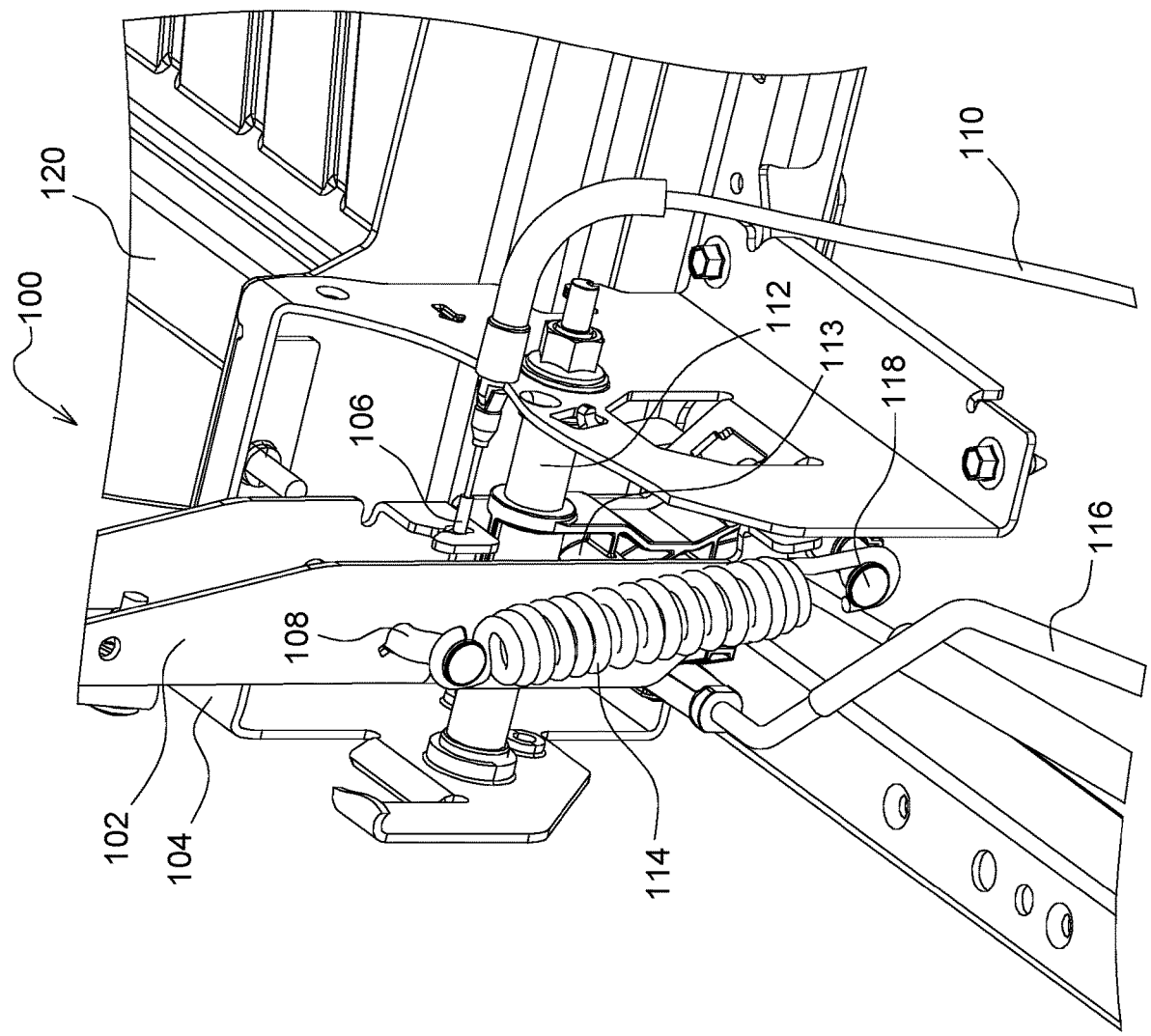
FIG. 2 is a perspective view of a zero turning radius mower park brake system according to a first embodiment of the invention showing the steering arm in neutral and the park brake disengaged.

In a first embodiment of the invention shown in FIGS. 1-5, zero turning radius mower park brake system 100 may be provided on a ZTR mower having a pair of steering arms or control levers 101. Each steering arm or control lever 101 may be attached to a steering arm bracket 102 which may be pivotably mounted to base 104 which is then mounted to frame member 120 adjacent an operator platform. For example, the pair of steering arm brackets 102 may pivot as described in U.S. Pat. No. 9,510,503 for Grass Mowing Machine Operator Platform owned by Deere & Company, or a similar structure. The ZTR mower also may have a rear mounted engine behind the operator platform, and a mower deck mounted to the frame members below and forwardly of the operator platform. Each steering arm or control lever may be used to control one of the rear drive wheels.

Figure 3:
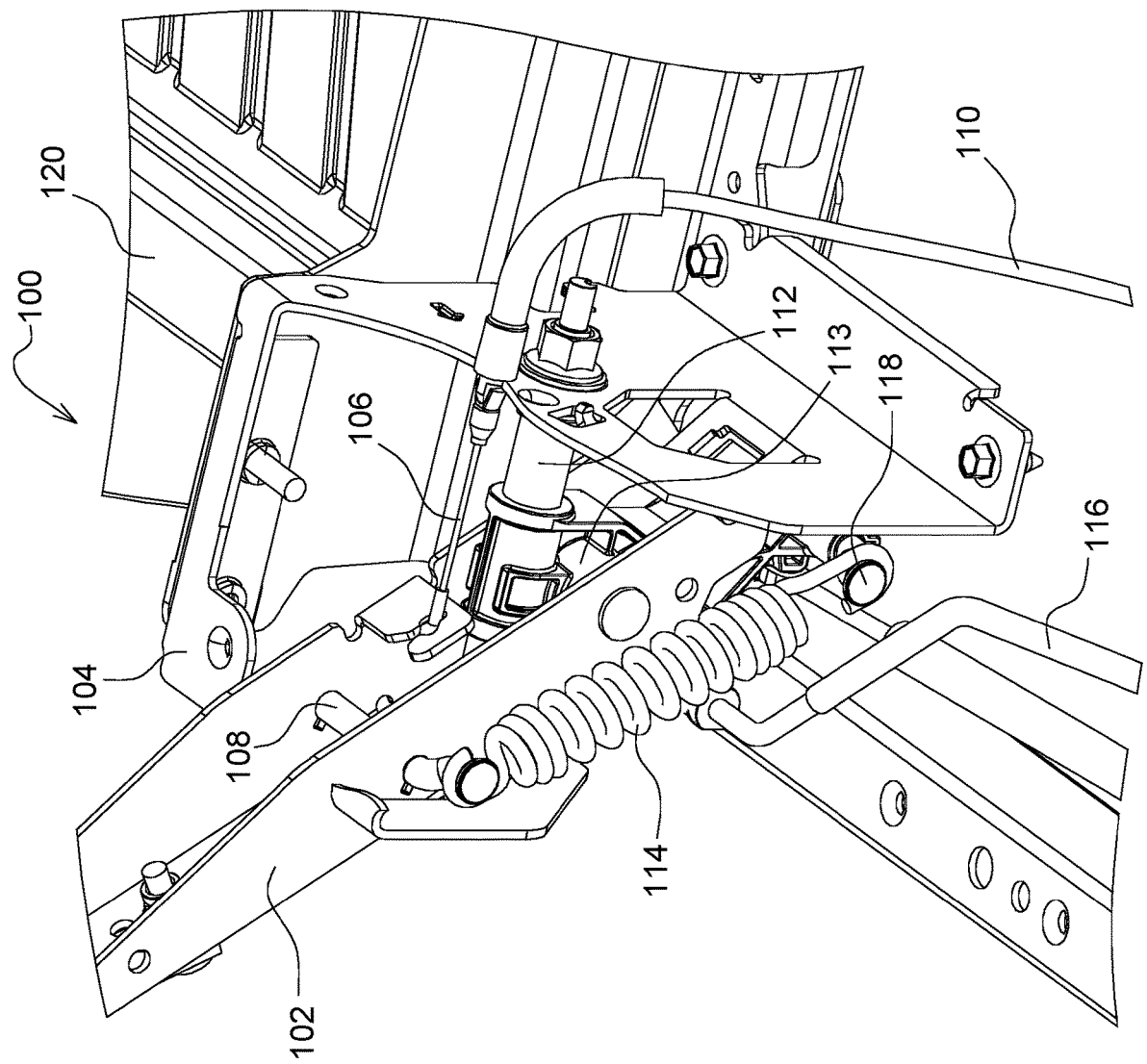
FIG. 3 is a perspective view of a zero turning radius mower park brake system according to a first embodiment of the invention showing the steering arm pivoted outward and the park brake engaged.
Figure 4:
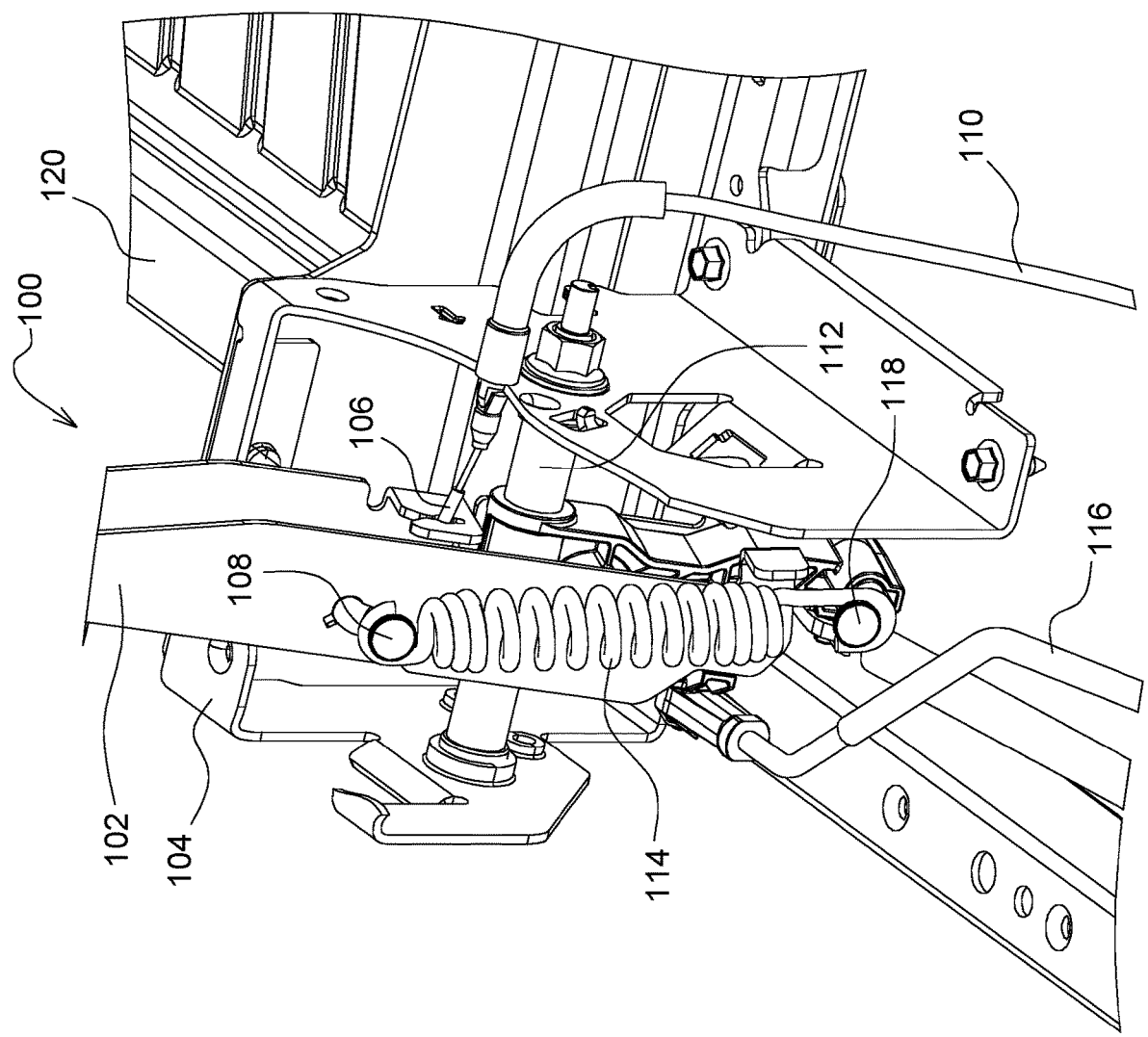
FIG. 4 is a perspective view of a zero turning radius mower park brake system according to a first embodiment of the invention showing the steering arm pivoted forward and the park brake disengaged.

It will be understood that the same or essentially the same zero turning radius mower park brake system 100 may be provided for each steering arm or control lever 101. The lower end of each steering arm or control lever 101 may be attached to steering arm bracket 102, which may be pivotably mounted to base 104. Base 104 may include first or forward/reverse pivot axis 112 which allows the steering arm bracket 102 to be pivoted forward to a maximum angle of about 20 degrees from neutral to cause a rear drive wheel to rotate forward as shown in FIG. 4, and pivoted rearward to a maximum angle of about 10 degrees from neutral to cause the rear drive wheel to rotate backward. For example, each steering arm bracket 102 may be connected by linkage 116 to a swash plate of a hydrostatic pump, or electrically connected to a drive motor or transaxle. Base 104 also may include a second or inward/outward pivot axis 113 which enables steering arm bracket 102 to pivot from the inward neutral position shown in FIG. 2, to the laterally outward position as shown in FIG. 3. The second or inward/outward steering pivot axis 113 may be located below and perpendicular to the forward/reverse pivot axis 112, and may allow the steering arm bracket to pivot outward to a maximum angle of about 36 degrees.

In one embodiment, zero turning radius mower park brake system 100 may include wire cable 110 connecting steering arm bracket 102 to park brake actuator 126. For example, wire cable 110 may be a Bowden cable with one end attached to steering arm bracket 102 at attachment point 106. More specifically, wire cable 110 may be attached to steering arm bracket 102 above the first or forward/reverse pivot axis 112, and slightly further above the second or inward/outward pivot axis 113. When steering arm or control lever 101 is pivoted outward to the maximum angle, steering arm bracket 102 pulls and retracts wire cable 110 sufficiently to cause actuator 126 to actuate or engage the park brake. However, when pivoted forward or rearward to the maximum angle, steering arm bracket 102 does not pull wire cable 110 sufficiently for actuator 126 to actuate or engage the park brake, due to the short distance between cable attachment point 106 and forward/reverse pivot axis 112. Instead, as shown in FIG. 4, forward or rearward pivoting of steering arm bracket 102 may only cause wire cable 110 to flex or bend forward or backward.

Figure 5:
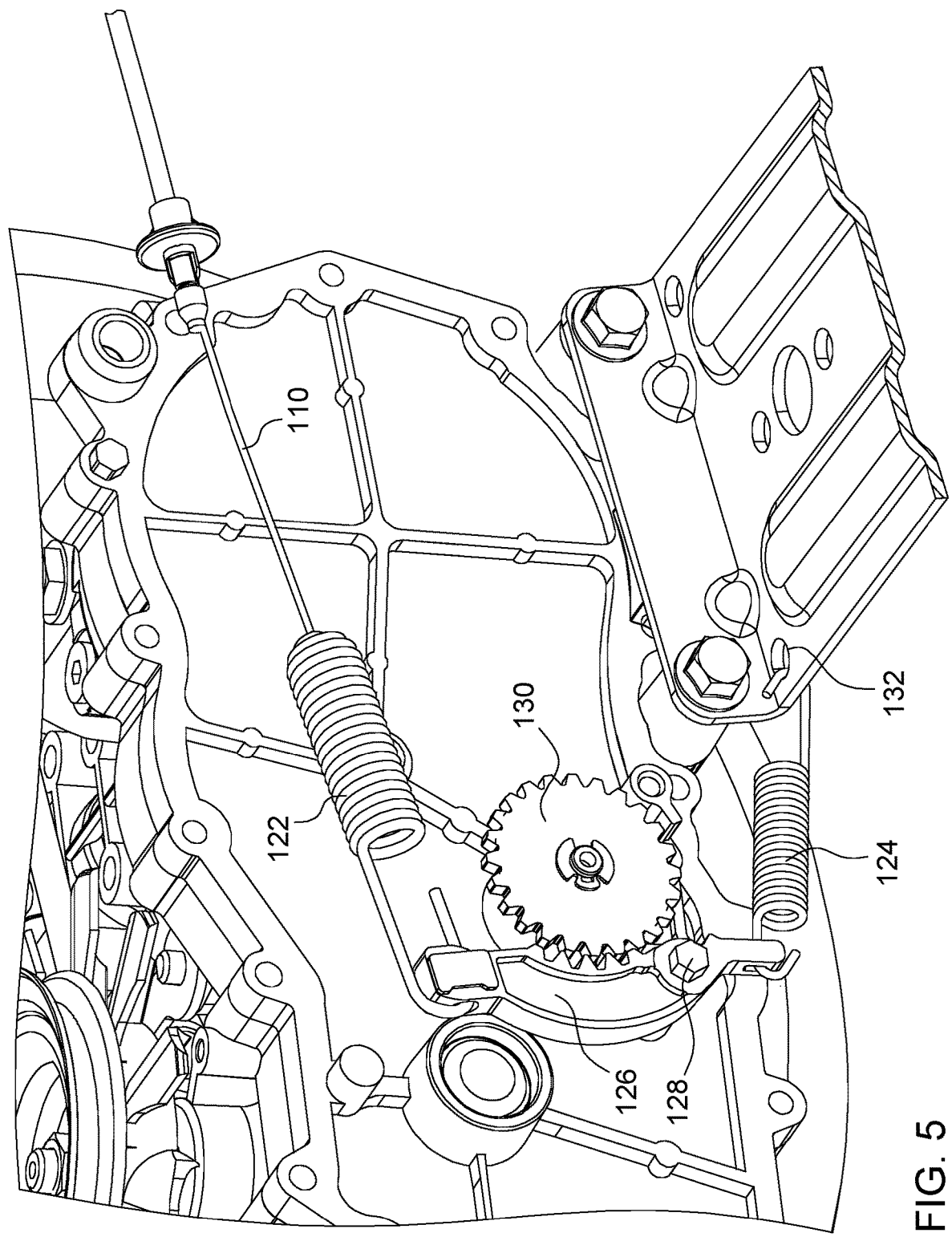
FIG. 5 is a perspective view of a zero turning radius mower park brake system according to a first embodiment of the invention showing a park engagement actuator.

In one embodiment, zero turning radius mower park brake system 100 may include park brake actuator 126 pivotably mounted to transaxle 134. For example, as shown in FIG. 5, park brake actuator 126 may be a pawl that may pivot on axis 128 to move teeth on the pawl into engagement with parking gear 130.

In one embodiment, zero turning radius mower park brake system 100 may include over center spring 114 connected between steering arm bracket 102 and base 104. The upper end of over center spring 114 may be connected to rod 108 on steering arm bracket above the forward/reverse pivot axis 112, and further above the inward/outward pivot axis 113. The lower end of over center spring 114 may be connected to rod 118 on base 104 below the steering arm bracket 102. Over center spring may provide a force opposing the outward pivoting of steering arm bracket 102 until steering arm bracket 102 pivots over center. Over center spring 114 then may retract and provide a force urging steering arm bracket 102 to pivot to the outward position. The torque provided by the over center spring is greater than the torque from the cable, and holds the park brake in engagement.

In one embodiment, zero turning radius mower park brake system 100 also may include engagement spring 122 connected between park brake actuator 126 and wire cable 110. Engagement spring 122 may be a coil spring providing a force urging park brake actuator 126 to engage or actuate the park brake. Additionally, the system also may include return spring 124 connected to park brake actuator 126. The park brake actuator may pivot to stretch return spring 124. Return spring 124 may provide a lower force than engagement spring 122, to bias park brake actuator out of engagement or actuation of the park brake when steering arm bracket 102 is not pivoted outward.

Having described the preferred embodiments, it will become apparent that various modifications can be made without departing from the scope of the invention as defined in the accompanying claims.

The invention claimed is:

1. A zero turning radius mower park brake system, comprising:
   a steering arm bracket having a connection point to a wire cable, said wire cable connected to a park brake actuator;
   the steering arm bracket pivotable on a first axis between a forward position and a reverse position and pivotable on a second axis between an inward position and an outward position;
   the steering arm bracket retracting the wire cable sufficiently to cause the park brake actuator to actuate a park brake when the steering arm bracket pivots to the outward position, and not retracting the wire cable sufficiently to actuate the park brake when the steering arm bracket pivots to the forward position or the reverse position.

2. The zero turning radius mower park brake system of claim 1 further comprising an over center spring providing a force urging the steering arm bracket to the outward position.

3. A zero turning radius mower park brake system of claim 1 further
   comprising:
   a park brake engagement spring between the wire cable and the park brake actuator into engagement with the park brake; and
   a return spring connected to the park brake actuator and providing a lower force than the park brake engagement spring, urging the park brake actuator out of engagement with the park brake.

4. The zero turning radius mower park brake system of claim 1 wherein the park brake actuator actuates the park brake by pivoting a pawl that engages a parking gear having teeth.

5. The zero turning radius mower park brake system of claim 1 wherein the wire cable is Bowden cable.

6. A zero turning radius mower park brake system, comprising:
   a pair of steering arms, each steering arm attached to a steering arm bracket, each of the steering arm brackets having a connection point to a wire cable;
   a forward/reverse pivot axis and an inward/outward pivot axis for each steering arm bracket;
   the wire cable connecting each steering arm bracket to a park brake actuator that engages a park brake when the wire cable is retracted by pivoting the steering arm bracket outward on the inward/outward pivot axis; and
   an over center spring connected to each steering arm bracket and providing a force urging the steering arm bracket outward to hold the park brake actuator in engagement with the park brake.

7. The zero turning radius mower park brake system of claim 6, wherein each park brake actuator is a pawl that engages a parking gear.

8. The zero turning radius mower park brake system of claim 6 further comprising an engagement spring connected between each wire cable and park brake actuator for urging the park brake actuator into engagement with the park rake, and return spring connected to each park brake actuator for urging the park brake actuator out of engagement with the park brake.

9. The zero turning radius mower park brake system of claim 6 wherein there is a greater distance from the inward/outward pivot axis to the connection point than from the forward/reverse pivot axis to the connection point.

10. A zero turning radius mower park brake system, comprising:
- a steering lever attached to a steering arm bracket that is pivotable forward and reverse on a first axis for rotating a traction drive wheel in forward or reverse, and is pivotable outwardly on a second axis while in a neutral position;
- a wire cable connecting the steering arm bracket to a park brake; the wire cable retracting sufficiently to actuate the park brake when the steering arm bracket is pivoted outwardly on the second axis, and the wire cable retracting insufficiently to actuate the park brake when the steering arm bracket is pivoted forward or reverse; and
- at least one spring providing a force urging the park brake into engagement when the steering arm pawls to park brake engaged position.

11. The zero turning radius mower park brake system of claim 10 wherein the spring is an over center spring that opposes pivoting the steering arm bracket outwardly until reaching an over center position.

\* \* \* \* \*